Patented Nov. 20, 1934

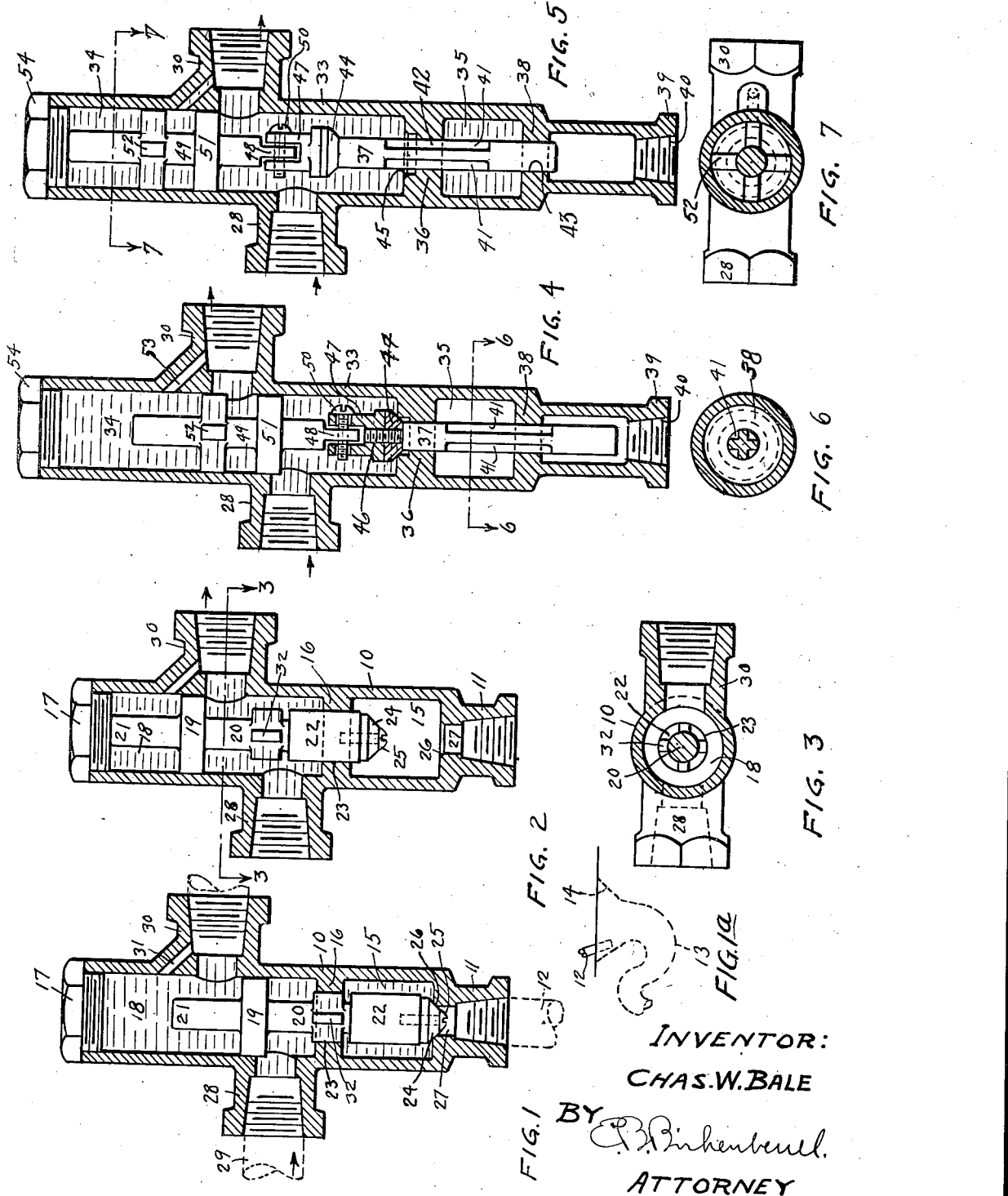

1,981,540

UNITED STATES PATENT OFFICE 1,981,540

PRIMER VALVE FOR FLOOR DRAINS

Charles W. Bale, Portland, Oreg., assignor to Harry W. Klosterman, Portland, Oreg.

Application January 29, 1934, Serial No. 708,836

4 Claims. (Cl. 182—12)

This invention relates generally to primer valves, and particularly to primer valves for floor drains.

The main object of this invention is to provide a simple form of primer valve which will positively insure the seal of a floor drain trap.

The second object is to provide a primer valve which will function properly over long periods of time regardless of the characteristics of the water passing through the valve.

The third object is to construct a primer valve which will deliver a measured quantity of water to the floor drain trap each and every time water is drained through the valve.

The fourth object is to construct a primer valve which is independent of fixed clearances in the operating parts, as is commonly the case where a leaking action is depended upon to provide the necessary water for the trap.

The fifth object is to provide a primer valve which will render it impossible for gases to be siphoned from the floor drain into the water supply system.

These, and other objects, will become more apparent from the specification following as illustrated in the accompanying drawing, in which:

Fig. 1 is a vertical section through the valve showing same in a closed position—that is, while no water is flowing through the valve.

Fig. 1-A is a side elevation of a floor drain at a reduced scale.

Fig. 2 is a view similar to Fig. 1 but showing water passing through the valve with its measured contents completely discharged.

Fig. 3 is a section taken along the line 3—3 in Fig. 2.

Fig. 4 is a vertical section through a modified form of the valve with no water passing through the valve and the reservoir being drained.

Fig. 5 is a view similar to Fig. 4 but showing water passing through the valve and the reservoir being charged.

Fig. 6 is a horizontal section along the line 6—6 in Fig. 4.

Fig. 7 is a horizontal section along the line 7—7 in Fig. 5.

Similar numbers of reference refer to similar parts throughout the several views.

Referring particularly to the form of the device shown in Figs. 1 to 3, same will be seen to consist of a cylindrical body 10 whose lower end 11 is internally threaded to receive the priming pipe 12 which connects with the trap 13 of the floor drain 14. Directly above the threaded end 11 is a chamber 15 which constitutes a measuring reservoir, on the top side of which is a dividing wall 16. The upper end of the body 10 is closed by means of a threaded cap 17.

The chamber 18 between the wall 16 and the cap 17 is cylindrical in form and contains a piston 19 which is mounted on the stem 20, whose upper end 21 stops against the cap 17 in its uppermost position—that is, when water is passing through the valve (as shown in Fig. 2). The lower end 22 of the stem 20 is adapted to slide through the opening 23 in the wall 16.

On the bottom of the end 22 is secured a composition valve disk 24 by means of a screw 25 which is threaded into the end 22. The disk 24 engages the valve seat 26 which is formed around the outlet opening 27 in the end 11 when water is not passing through the valve, during which time the chamber 15 is completely filled with water.

On one side of the body 10 and below the lowermost position of the piston 19 is a threaded inlet connection 28 through which water enters the valve from the supply pipe 29. The body 10 is also provided with an outlet connection 30 which is above the lowermost position of the piston 19. The connection 30 delivers water to any of the outlet faucets or valves through which water is drawn for any desired purpose.

It is desirable to form a relief port 31 connecting the upper portion of the chamber 18 with the interior of the outlet 30 to prevent water from being trapped in the upper end of the chamber 18, thereby preventing the proper functioning of the valve.

On the stem 20 between the piston 19 and the lower end 22 are the lugs 32 which guide in the opening 23. The spaces between the lugs 32 form large passageways through which water must pass from the lower end of the chamber 18 down into the measuring chamber or reservoir 15 when the disk 24 is being seated.

The operation of this form of the device is as follows: Assuming that the connection 28 is joined to a pressure supply pipe 29 and that the connection 30 is joined to an outlet faucet (not shown), and that it is desired to draw water from the faucet, it can readily be seen that the opening of the faucet will permit the water on the under side of the piston 19 to raise same to a point which will cause water to flow through the outlet 30. This raising of the piston 19, however, has caused the enlarged stem end 22 to fully occupy the opening 23, thus preventing any siphoning action of the gases into the water supply, which of course would be very undesirable.

In the meantime the water which was stored in the chamber 15 flows through the outlet 27 through the primer pipe 12 into the trap 13, but no matter how long the faucet is kept open only the single measured quantity will flow into the trap. This, of course, will be repeated every time the faucet is operated, therefore the capacity of the chamber 15 is necessarily small but the delivery of the water is positive, inasmuch as the space between the lugs 32 is relatively large and is positively flushed each time the chamber 15 is filled. This eliminates the difficulty ordinarily encountered when attempts are made to regulate the priming water by fixed clearance spaces.

Another advantage arising from the use of this device is that, regardless of how long the water is drawn through the valve, the priming action occurs but once at each drawing, instead of continuously leaking into the trap.

In the form of the device shown in Figs. 4 to 7 inclusive the same measuring principle is employed but the condition is reversed—that is to say, when no water is being drawn through the valve the measuring reservoir is empty. The details of this modification are as follows: The body 33 is provided with the inlet 28 and the outlet 30, which are disposed in substantially the same position as they are in the first description of the device as illustrated in Figs. 1 to 3.

Below the chamber 34 is a measuring chamber 35 from which it is separated by the wall 36. A sliding stem 37 passes through the wall 36 and through the bottom 38 of the chamber 35. The lower end 39 of the body 33 is provided with a threaded outlet opening 40 which connects with the primer pipe 12. The stem 37 is cut away along its mid portion to form the V-shaped channels 41. These are so positioned that when the stem 37 is in its lowermost position the opening 42 in the wall 36 is closed and the opening 43 in the bottom 38 is open; whereas when the stem 37 is in its uppermost position the reverse condition exists—that is, the chamber 35 fills when the stem 37 is up.

On the upper end of the stem 37 is secured the composition valve disk 44 which engages a seat 45 formed around the upper end of the opening 42 when the stem 37 is down. The threaded shank 46 which passes through the disk 44 has attached thereto a forked nut 47 to which is loosely attached the lower end 48 of a piston rod 49 by means of a screw 50. Below the middle of the rod 49 is disposed the piston 51 above which are disposed the lugs 52, which merely serve to guide the upper end of the rod 49 within the chamber 34. The relief port 53 serves to prevent the trapping of water in the upper end of the chamber 34. The upper end of the body 33 is closed by means of a cap 54.

The operation of this form of the device is as follows: When the faucet is open and water is drawn into the valve through the inlet 28 and out of the outlet 30 the unbalance of pressure causes the piston 51 to rise, drawing with it the stem 37, thereby closing the lower end of the chamber 35 and opening its upper end thus permitting it to fill with water, and while this water remains in the chamber 35 until the faucet is closed, there is of course a slight leakage of water around the lower end of the stem 37. Although this will soon cease as the clearance is taken up by sediment, the main reliance for the priming water is placed in the measured quantity contained within the chamber 35. Obviously, when the faucet is shut off the piston 51 descends, un⋅ᵊr the combined action of pressure and gravity, to the position shown in Fig. 4, at which time the water is permitted to drain from the chamber 35 into the trap.

It can be seen that while both of these forms of the device employ the measurement of water for priming purposes, the main difference resides in the fact that in the form shown in Figs. 1 to 3 inclusive the measuring chamber is closed and full of water when no water is flowing through the valve; while in the modification shown in Figs. 4 to 7 inclusive the measuring chamber 35 is empty and open at its lower end when no water is flowing through the valve.

I claim:

1. A primer valve having a body containing a cylindrical recess having inlet and outlet connections, a measuring reservoir associated with said cylindrical recess communicating therewith and having an outlet opening through which water may be delivered to a drain trap, valve means for controlling the admission of water to and escape from said reservoir; and a piston within said cylinder actuated by the passage of water therethrough and having a connection to said valve means whereby a measured quantity of water will be released from said reservoir each time water is permitted to flow through said cylinder.

2. A primer valve comprising an elongated cylindrical body having a dividing wall between the ends thereof on one side of which is a measuring reservoir and on the opposite side of which is an operating cylinder, said measuring reservoir having an outlet opening and also having an inlet opening communicating with the operating cylinder, a stem slidably mounted in the axis of said openings, one end of said stem having means for closing the outlet opening of said reservoir when said stem is moved in one direction and for cutting off communication to said cylinder when said stem is moved in the opposite direction, a piston in said cylinder disposed on said stem, an inlet for said cylinder between said piston and the dividing wall, and an outlet for said cylinder spaced from said wall a greater distance than is said inlet.

3. A primer valve comprising a tubular body having a dividing wall between the ends thereof, one end of said tube having a valve controlled outlet and the other end of said tube having a closure across same, said dividing wall having an opening therein affording a connection between the valve controlled side of the wall and the closed end of said body, the valve controlled end of said tube constituting a measuring reservoir and the opposite end thereof comprising a valve actuating cylinder, a piston within said cylinder, said cylinder having inlet and outlet ports therein whereby the flow of fluid from said inlet port through said outlet port will move said piston toward the closed end of the tubular body, a stem fixed to said piston for actuating said reservoir outlet valve, said stem having an enlarged portion forming a closure for the opening in said wall while water is flowing through said tubular body during which time said reservoir outlet is held open.

4. A primer valve comprising an elongated tubular body having a closure at one end and a reduced opening at the opposite end thereof, a dividing wall between the ends of said tubular body having an aperture in alignment with said reduced outlet, a recess formed between said dividing wall and the closed end of said tube forming an actuating cylinder well, the recess on the opposite side of said wall forming a measuring reservoir for which said reduced opening forms an outlet, a stem passing through the aperture of said dividing wall and continually guiding therein, a piston on said stem guiding in the actuating cylinder, a valve disk on the end of said stem adapted to seat in said reduced outlet opening when the piston is in one extreme position, the portion of said stem then occupying said dividing wall aperture being cut away to permit the passage of water from said actuating cylinder to said reservoir, said cylinder having ports in the sides thereof disposed on opposite sides of said piston when said valve disk is in a seating position.

CHARLES W. BALE.